(No Model.)
N. B. GINOCHIO & H. C. BRIDGER.
UNDERGROUND TROLLEY SYSTEM.
No. 543,130.                                     Patented July 23, 1895.
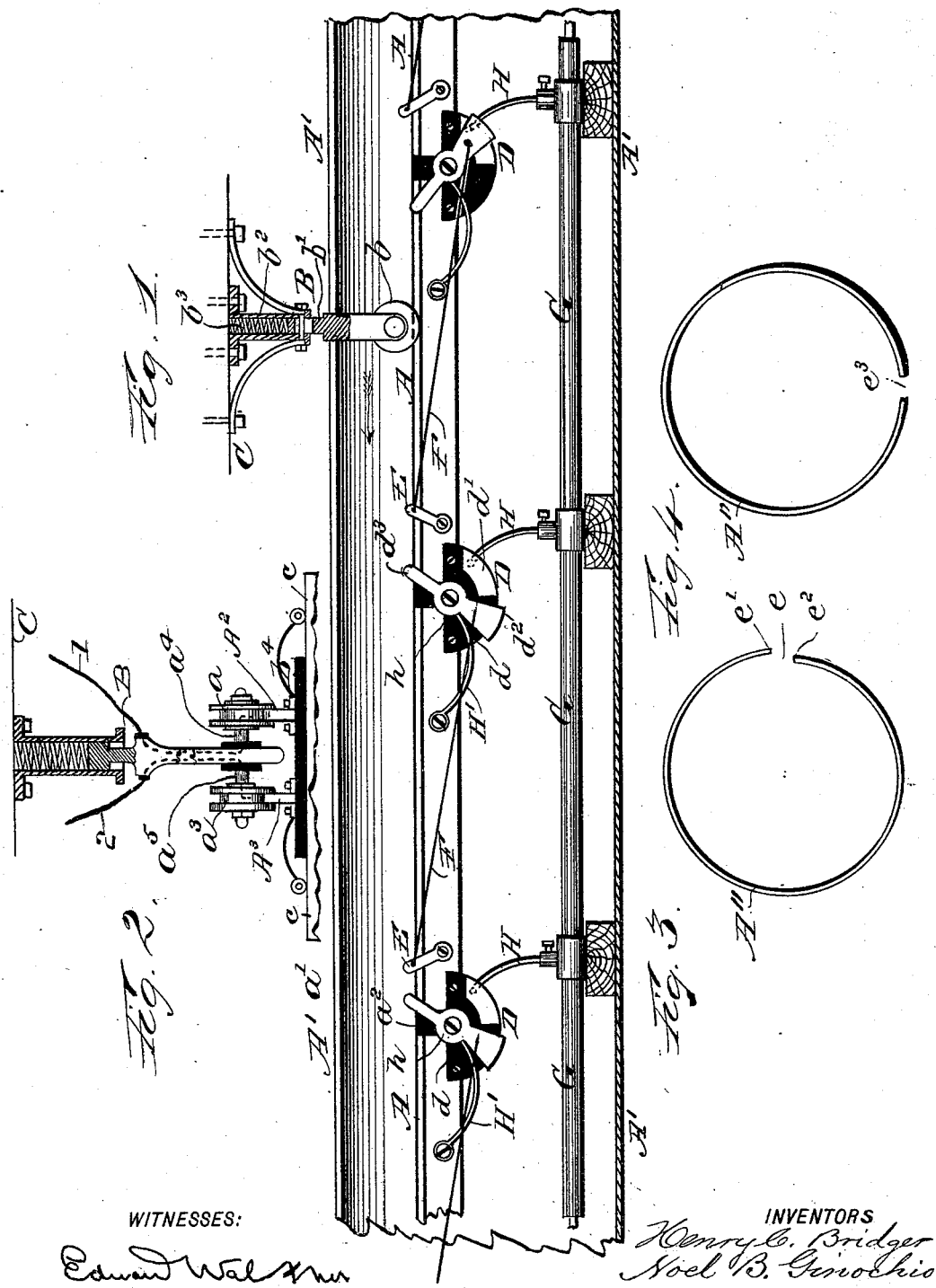
WITNESSES:
Edward Walker
Nathaniel Barr
INVENTORS
Henry C. Bridger
Noel B. Ginochio
BY
H. L. Bennem
ATTORNEY.

UNITED STATES PATENT OFFICE.

NOEL B. GINOCHIO, OF NEW YORK, N. Y., AND HENRY C. BRIDGER, OF WOODRIDGE, NEW JERSEY.

UNDERGROUND-TROLLEY SYSTEM.

SPECIFICATION forming part of Letters Patent No. 543,130, dated July 23, 1895.

Application filed December 27, 1894. Serial No. 533,066. (No model.)

*To all whom it may concern:*

Be it known that we, NOEL B. GINOCHIO, a citizen of the United States, and a resident of New York city, in the county of New York and State of New York, and HENRY C. BRIDGER, a subject of the Queen of Great Britain, now residing at Woodridge, in the county of Bergen and State of New Jersey, have invented certain new and useful Improvements in Underground-Trolley Systems, of which the following is a specification.

This invention relates to electric railways in which the main-circuit wire and its appurtenances is located in a conduit below the track bed or surface, the object being to provide an underground-trolley system in which the loss of the power-current by conduction is reduced to a minimum.

In our system we may employ either a metallic or a ground circuit for the return-current. It is found preferable, however, to employ a metallic circuit for obvious reasons.

We will describe a railway system embodying our invention, and then point out the novel features in the appended claim.

In the accompanying drawings, Figure 1 is a side elevation and longitudinal section of a system embodying our improvement. Fig. 2 is a partial section and partial elevation showing a modified construction in which a metallic return-circuit is employed. Fig. 3 is an end view of a conduit of modified form, and Fig. 4 shows another modification thereof.

Referring first to the example shown in Fig. 1, A' designates a tubular conduit made in any desired lengths and secured together in any desired manner. It may be here stated that the conduit may be made of any suitable material impervious to water and moisture and preferably having a high electrical resistance. In this example the conduit has a longitudinal slot-opening $a'$ in its upper side for the passage of the trolley-hanger.

A designates a contact line or track supported within the conduit in any desired manner. The contact line or track is made in sections of suitable lengths and the sections are insulated one from the other, as shown at $a^2$.

D indicates switches for making and breaking electrical connections between the central line or track sections, and an insulated main-line wire G within the conduit. Each switch D comprises a plate $d$ of insulating material supported or secured to the contact line or track sections, a metal contact-plate $d'$ on the plate $d$, and a metal rock-lever $d^2$, adapted to engage with the plate $d'$. The plate $d'$ is made in the form of a segment of a circle and extends but a portion of the way around the plate $d$, as plainly shown in Fig 1. The rock-lever $d^2$ has an arm $d^3$, which, when the lever is out of contact with the plate $d'$, extends above the plane of the contact line or track A, so as to be engaged by a trolley, as will hereinafter be more fully described.

H designates metallic connections between the plates $d'$ and the main-line wire G, and H' designates contact-strips forming electrical connection between the levers $d^2$ and the sections A. These strips H' are secured at one end to the contact-line sections and at the other end bear against a rounded or cam-shaped edge $h$ of the levers, and the strips are made of resilient metal, so that they not only serve for the purpose above mentioned, but also serve as a retarding device to prevent a too easy movement of the levers.

E indicates trip-arms pivotally connected to the sections A and having their upper ends extended above the upper surface of the sections A or within the line of movement of the trolley, so as to be rocked or tripped by the trolley.

There is a connection F between each trip-arm and the lower portion of the lever $d^2$ immediately in its rear.

B designates a trolley-hanger extended through the slot $a'$ and having a trolley $b$ at its lower end adapted to bear upon the contact line or track A.

We prefer to provide means for allowing a vertical yielding movement for the trolley-hanger, so that the operation of the trolley will not be interrupted by possible variations in the plane of the sections A. With this end in view we make the hanger in two telescopic sections $b'$ $b^2$, the upper one $b^2$ being tubular. Within this tubular portion $b^2$ is a spring $b^3$, which bears at its lower end against the upper end of the section $b'$.

The hanger is secured to a car C in any desired manner, and a suitable lead-wire provides connection between the hanger and the motor on the car. The other lead-wire from the motor extends to the ground circuit.

The operation of the device above described is as follows: Assuming a car to be moving in the direction of the arrow adjacent the hanger B, it will be seen that the switch D in the rear of the trolley is closed so as to connect the section A, with which the trolley is engaged, with the main-line wire G. When the trolley reaches the trip-arm E, it will rock the same to open the first switch, and then the trolley will strike the arm $d^3$ of the next lever $d^2$ and shift it to close the circuit between the next section A and the main-line wire, and of course this operation will be carried out throughout the entire length of the road.

It will be seen by this construction only one section A beneath a car will be energized, which, obviously, provides for a great saving in the electrical energy and obviates danger from sections forward or rearward of a car.

Referring now to the example shown in Fig. 2, it is to be understood that the same switch mechanism as heretofore described is employed. In this example we employ contact-line sections $A^2$ and metallic return-sections $A^3$, and the trolley-hanger B supports two trolleys $a$ $A^3$, which engage respectively with the sections $A^2$ $A^3$. The trolleys $a$ $a^3$ are mounted on studs $a^4$ $a^5$, extended from but having insulating connection with the trolley-hanger. From the stud $a^4$ a wire 1 leads to one pole of the motor and from the stud $a^5$ a wire 2 leads to the other pole of the motor.

The parts $A^2$ $A^3$ may be mounted on plates of insulating material $b^4$, which are mounted on cross-strips $c$.

The conduit $A^{11}$ (shown in Fig. 3) has its slot-opening $e$ in its side, and the upper wall $e'$ of the slot extends outward beyond the vertical plane of the lower wall $e^2$.

The conduit $A^{12}$ (shown in Fig. 4) has the slot $e^3$ in its lower side. In both these examples it will be seen that water or dirt cannot enter or drip through the slot. Of course with the slots located as just described, the trolley-hanger must be bent or curved to suit the existing condition.

Having described our invention, what we claim is—

The combination with a main line wire and a contact line, of the switches secured to the contact line and comprising the plates of insulating material, the segmental contact plates thereon, the levers having the upwardly extending arms, the connections between the contact plates and the main line wire, and the resilient electrical connections between the contact line and levers, the said resilient connections serving also as retarding devices for the levers, substantially as specified.

NOEL B. GINOCHIO.
HENRY C. BRIDGER.

Witnesses:
CLARENCE R. FERGUSON,
WM. L. BENNEM.